US006286107B1

(12) United States Patent
Tamaki et al.

(10) Patent No.: US 6,286,107 B1
(45) Date of Patent: Sep. 4, 2001

(54) METHOD AND APPARATUS FOR SIGNAL INTERFACING CAPABLE OF INFALLIBLY NOTIFYING A STATUS OF AN APPARATUS

(75) Inventors: Shunpei Tamaki, Hadano; Keizo Baba, Atsugi, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/281,505

(22) Filed: Mar. 30, 1999

(30) Foreign Application Priority Data

Mar. 31, 1998 (JP) .................................................. 10-085476

(51) Int. Cl.$^7$ ........................................................ G06F 1/26
(52) U.S. Cl. ............................................. 713/320; 713/340
(58) Field of Search ................................... 713/300, 320, 713/322, 323, 328, 601

(56) References Cited

U.S. PATENT DOCUMENTS

| | | | |
|---|---|---|---|
| 5,790,873 | * 8/1998 | Popper et al. ...................... | 395/750 |
| 5,832,280 | * 11/1998 | Swanberg ............................ | 395/750 |
| 5,844,813 | * 12/1998 | Tateyama ............................. | 364/528 |
| 5,848,281 | * 12/1998 | Smalley et al. ..................... | 395/750 |
| 6,041,401 | * 3/2000 | Ramsey et al. ...................... | 712/43 |
| 6,148,345 | * 11/2000 | Yamaki .............................. | 709/253 |

* cited by examiner

*Primary Examiner*—Bipin Shalwala
*Assistant Examiner*—Nitin Patel
(74) *Attorney, Agent, or Firm*—Cooper & Dunham LLP

(57) ABSTRACT

An interfacing apparatus, connecting between a host system and a data processing device and including a parallel interface function for transmitting signals, includes an energy saving mode controller and an interface circuit controller. The energy saving mode controller selectively switches the apparatus into an energy saving mode from an idling mode. In the energy saving mode, the energy saving mode controller cuts off power for driving an interface circuit, except for a minimal power required to be supplied to at least one predefined portion of the interface circuit. The interface circuit controller notifies the host system of statuses of the interface apparatus using at least one status signal line. After having entered the energy saving mode, the interface circuit controller maintains the at least one logic level signal line at a status which is reversed from a usual logic level thereof in the idling mode.

32 Claims, 9 Drawing Sheets

Fig. 2

| SIGNAL NAME | PCIF-CN | | DESCRIPTION | | |
|---|---|---|---|---|---|
| | PIN No | I/O | COMPATIBLE | NIBBLE | NEGOTIATION |
| STROBE | 1 | I | DATA TRANSMISSION STROBE | HIGH:INHIBITING A RECEIPT BY PERIPHERAL SIDE | DATA TRANSMISSION STROBE |
| P1OD 0 | 2 | I/O | DATA CHANNEL:LSB | NOT USED | DATA CHANNEL:LSB |
| P1OD 1 | 3 | I/O | DATA CHANNEL | NOT USED | DATA CHANNEL |
| P1OD 7 | 9 | I/O | DATA CHANNEL:MSB | | DATA CHANNEL:MSB |
| ACK | 10 | O | ACK FOR RECEIVED DATA | DATA TRANSMISSION NOTICE | NOTICE FOR EFFECTIVENESS OF SELECT RESPONSE |
| BUSY | 11 | O | NOTICE FOR RECEIPT INABILITY | DATA BIT 3, 7 | NOTICE FOR RECEIPT INABILITY |
| PENO | 12 | O | NOTICE FOR MACHINE ERROR | DATA BIT 2, 6 | |
| SLCT | 13 | O | ONLINE NOTICE | DATA BIT 1, 5 | NOTICE FOR RESPONSIBILITY TO REQUESTED MODE |
| AUTFD | 14 | I | USED AS VERIUS REQUEST SIGNALS | LOW:POSSIBLE TO RECEIVE HIGH:ACK | NOTICE FOR A START OF 1284 MODE |
| PCCOM | 30 | P | COM | COM | COM |
| INIT | 31 | I | | SET TO HIGH | SET TO HIGH |
| FAULT | 32 | O | ERROR NOTICE | DATA BIT 0, 4 | NOTICE FOR DATA TRANSMISSION |
| NC | 35 | – | – | – | – |
| SLCIN | 36 | I | SET TO LOW | SET TO HIGH | REQUEST 1284 MODE |

Fig. 3

| SIGNAL NAME | DRIVER SIDE<br>H:HOST<br>P:PERIPHERAL | STATUS IN<br>IDLING MODE |
|---|---|---|
| STROBE | H | H |
| P1OD 0 | H/P | L |
| P1OD 1 | H/P | L |
| P1OD 7 | H/P | L |
| ACK | P | H |
| BUSY | P | L |
| PENO | P | L |
| SLCT | P | H |
| AUTFD | H | H |
| INIT | H | H |
| FAULT | P | H |
| SLCIN | H | L |

Fig. 7

| | STATUS SIGNAL | | REMARKS |
|---|---|---|---|
| | ACK | SELECT | |
| NORMAL MACHIN IDLING | HIGH | HIGH | — |
| ESM MODE<br>AUTO-FEED: HIGH ......<br>LOW | SAME STATUS AS AUTO-FEED SIGNAL<br>HIGH | LOW | — |
| POWER-OFF MODE<br>AUTO-FEED: HIGH ......<br>LOW | SAME STATUS AS AUTO-FEED SIGNAL<br>HIGH<br>LOW | SAME STATUS AS AUTO-FEED SIGNAL<br>HIGH<br>LOW | TO BE REVERSED AT THE SAME TIME WHEN AUTO-FEED SIGNAL IS REVERSED |

US 6,286,107 B1

METHOD AND APPARATUS FOR SIGNAL INTERFACING CAPABLE OF INFALLIBLY NOTIFYING A STATUS OF AN APPARATUS

BACKGROUND OF THE INVENTION

1. Field of the Invention

This invention relates to a method and apparatus for interfacing a data processing device to a host system, and more particularly to a method and apparatus for interfacing a data processing device to a host system and capable of infallibly notifying the host system of statuses of the data processing device.

2. Discussion of the Background

Conventionally, computer peripheral devices such as printers, scanners, and so on have been provided with a power control system in which the power to the machine is turned on and off when a host system such as a personal computer is turned on and off. However, there has is recently been developed another type of computer peripheral device that includes a facsimile function and therefore requires power at all times regardless of whether the host system is turned on. One such type of computer peripheral device is referred to as a multiple function peripheral (MFP), capable of performing a variety of functions such as printing, scanning, copying, and facsimile in one unit. Such an MFP generally has a data transmitting function for transmitting data to the host system and a data receiving function for receiving data from the host system.

Because of environmental conservation concerns, many institutes for industrial standards in various countries have recently been issuing recommendations for reducing power consumption of data processing apparatuses, including computer peripheral devices, when in a machine idling mode. However, reduction of power consumption in a machine idling mode has raised technical issues regarding connected systems. That is, two separate systems connected through an interface device are required to be capable of detecting a request for action from each other and, at the same time, reducing power consumption when in a machine idling mode.

Japanese Laid-Open Patent Publication No. JPAP08-224944 (1996) has introduced a printer which addresses this technical issue. This printer is provided with a power shut-down circuit which can automatically turn off power by judging the power status of a host system by reading the voltage level of a strobe signal from the host system.

In addition to the host system and the computer peripheral devices, interface devices which interface between the host system and the computer peripheral devices are preferably turned off during the machine idling mode since these interface devices generally demand a relatively high circuit-drive capability and therefore consume a relatively large amount of power. Accordingly, techniques have been studied for reducing power consumption in an interfacing device by dropping all the receiver power other than the power necessary for performing an access detection during a machine idling mode.

Although the present invention is not limited to an MFP having an interface to a host system, the following description describes an MFP as one example. Generally, an interface device between a host system and an MFP is conformable to a parallel interface such as Centronics standard interface using a Centronics connector. This interface device includes a plurality of command signal lines from the host system, a plurality of status signal lines from the MFP, and a plurality of bidirectional data lines. In the interface device, receiver terminal side lines are usually pulled up to a power line.

Such a parallel interface is generally designed in accordance with one or more of the circuits as shown in FIGS. 8A–8D or an equivalent. The circuits include drivers as output circuits, on a driver side 41 of a cable 40 and receivers as receiving circuits on receiver side 42 of the cable 40. FIG. 8A shows input and output buffers 32 and 30, respectively, each provided with a protection diode 34 provided between a power line PL and power input of the buffer. Parasitic diodes 36 are provided between protection diodes 34 and the output or input lines to buffers 30, 32 respectively and between the output and input lines and ground, as shown. In this case, protection diodes 34 are provided to protect the power supply of a powering device from flowing into a powered-down device through the parasitic diodes 36. FIG. 8B shows input and output buffers 32, 30, respectively, configured to eliminate the need for several of the parasitic diodes 36 but which includes a protection diode 34 for inhibiting a voltage leakage through a common pull-up resistor Rp on the receiver side 42. FIG. 8C shows an open-drain driver which includes a pull-up resistor Rp. In addition, FIG. 8D shows an equivalent circuit which includes drivers 30, 39 and receivers 32, 38 for providing bidirectional signal lines.

In a parallel interface using the circuits shown in FIGS. 8A and 8B, a host system can detect a status signal at a high level through the status signal line when the power of the interface device at the MFP side is turned off. However, in the case of FIG. 8C, the host system cannot judge die level of the status signal since the signal level of the status signal unstably varies according to the values of the pull-up resistors RP provided on the driver side 41 and receiver side 42.

FIG. 9 illustrates an interface arrangement for interfacing between an MFP and a host system, for example. The MFP receives command signals from the host and sends status signals to the host. Bidirectional data is also exchanged between the MFP and the host. However, since the protection diodes 34 for protecting against voltage leakage are generally used in common for all the pins of the interface, as illustrated in FIG. 9, the signal level of the status signal lines unstably varies according to the statuses of other signals from the host system when the MFP is in an energy savings mode. Accordingly, the host system cannot judge the level of the status signal lines. It may be possible for the host system to determine that the MFP is not in a usual machine idling mode (e.g., is in an energy savings mode), by detecting such an unstable status signal level from the MFP in response to a command signal from a host system. However, this signal handling would be nothing but a waste of performance for other operations which may be AL o being performed in the host system. Further, when an MFP having an energy saving function such as a power shut-down in a machine idling mode is connected to a host system, it may cause the drivers of the host system which do not conform to the energy saving function to erroneously operate.

Therefore, there is presently no interfacing apparatus available which is capable of appropriately notifying a host system of machine statuses.

SUMMARY OF THE INVENTION

An interface apparatus connects between host system and a data processing device and includes a parallel interface function for transmitting data, command, and status signals which are communicated therebetween. The apparatus includes an energy saving mode controller and an interface circuit controller. The energy saving mode controller selectively switches the apparatus to an energy saving mode from an idling mode in response to a predefined condition. In the energy saving mode, the energy saving mode controller cuts off power for driving an interface circuit, except for a minimal power required to be supplied to at least one predefined portion of the interface circuit. The interface circuit controller notifies the host system of a status of the interface apparatus using at least one status signal line. After having entered the energy saving mode, the interface circuit controller maintains the at least one status signal line at a logic level which is reversed from a usual logic level thereof in the idling mode.

The interface circuit controller may notify the host system of statuses of the interface apparatus using a high or low level status signal via a status signal line. Also, the interface circuit controller may maintain the status signal line at a high level after entering the energy saving mode, using power from a command signal line from the host system which is raised to a high level in the idling mode, when the status signal is required to be output as a high level signal after the interface apparatus has entered the energy saving mode.

The interface circuit controller may receive a high or low level command from the host system via a command signal line. Also, the interface circuit controller may notify the host system of statuses of the interface apparatus using a high or low level status signal via a status signal line. Also, the interface circuit controller may return the command signal sent from the host system through the command signal line back to the host system as a signal having a different signal level from a signal level thereof in the idling mode or the energy saving mode when the interface apparatus is in a power-off mode.

A data processing apparatus connects to a host system and includes a parallel interface function for transmitting data, command, and status signals which are communicated with the host system. The data processing apparatus includes an energy saving mode controller and an interface circuit controller. The energy saving mode controller selectively switches the apparatus to an energy saving mode from an idling mode in response to a predefined event. The energy saving mode controller cuts off power for driving an interface circuit in the energy saving mode, except for a minimal power required to be supplied to at least one predefined portion of the interface circuit. The interface circuit controller notifies the host system of statuses of the interface apparatus using at least one status signal line. The interface circuit controller maintains the at least one status signal line at a logic level which is reversed from a usual logic level thereof in the idling mode after having entered the energy saving mode.

An interfacing method of an interface apparatus which connects between a host system and a data processing device and includes a parallel interface function for transmitting data, command, and status signals which are communicated therebetween. The interfacing method includes the steps of selectively switching the apparatus into an energy saving mode from an idling mode in response to a predefined event, cutting off power for driving an interface circuit in the energy saving mode, except for a minimal power required to be supplied to at least one predefined portion of the interface circuit, notifying the host system of statuses of the interface apparatus using at least one status signal line, and maintaining the at least one status signal line at a logic level which is reversed from a usual logic level thereof in the idling mode after entering the energy saving mode.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is an exemplary list showing pin assignments and signal statuses of signal interfacing according to the IEEE 1284 Centronics standard interface;

FIG. 3 is an exemplary list showing pin assignments and signal statuses of signals used in the data processing apparatus of FIG. 1;

FIG. 7 is a table showing signal statuses differently arranged according to a mode of the data processing apparatus of FIG. 1;

DESCRIPTION OF THE PREFERRED EMBODIMENTS

Figure 1:
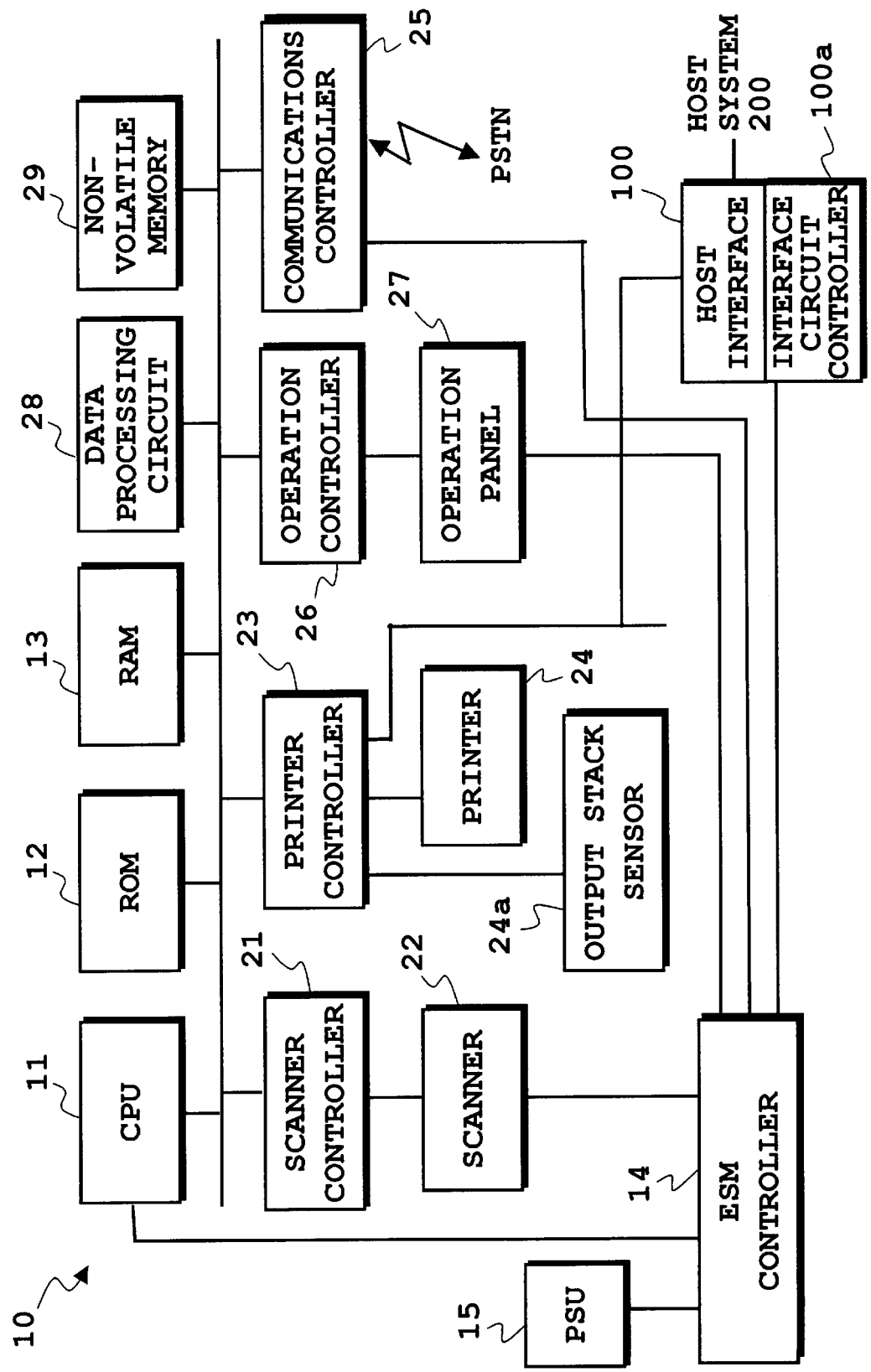
FIG. 1 is a schematic block diagram of a data processing apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a schematic block diagram of an MFP (multiple function peripheral) apparatus according to an embodiment of the present invention. Although described herein as it relates to an MFP, the present invention is not limited to MFP devices. For example, although the MFP apparatus 10 of FIG. 1 includes a host interface 100 installed within an enclosure of the MFP apparatus 10, the host interface could be provided in another type of device or as a stand-alone device. The host interface 100 is connected to a host system 200 (e.g., a personal computer) so as to realize data transmitting and receiving functions for transmitting data to and receiving data from the host system 200, enabling the MFP apparatus 10 to perform a variety of functions, such as printing, scanning, copying, and facsimile, functions usable by the host system 200.

The MFP apparatus 10 is configured to operate in such a way that a CPU (central processing unit) 11 controls each part of the MFP apparatus 10, storing data necessary for performing operations into RAM (random access memory) 13, in accordance with control programs stored in ROM (read only memory) 12. The MFP apparatus 10 performs a scanning function with a scanner controller 21 and a scanner 22, a printing function with a printer controller 23 and a printer 24, a copying function with a combination of the scanning and printing functions, a facsimile function with a communications controller 25 which includes a modem (not shown) and a network controller (not shown). The MFP apparatus 10 performs an image information correction function for correcting input image information, and encoding function for compressing image information to be transmitted and a decoding function for decompressing image information which has been received, with a data processing circuit 28. The MFP apparatus 10 includes a non-volatile re-programmable memory 29 for storing information relative to a communications destination, such as a name, a telephone number, a quick dialing number, a short-cut number, and so on. The MFP apparatus 10 further includes a variety of sensors, one of which is an output stack sensor 24a for detecting when an amount of sheets stacked at an output of the printer 24 exceeds a predetermined volume.

When the MFP apparatus 10 waits for commands from the host system 200 requesting an action, for a predetermined period of time or longer, the MFP apparatus 10 shifts its operation mode into an energy saving mode (ESM), in which distribution of power from a power supply unit 15 to each unit of the MFP apparatus 10 is controlled to be reduced down to a lowest level, by an ESM (energy saving mode) controller 14. The lowest power condition in such an ESM preferably is sufficient to allow the MFP apparatus 10 to detect at least an action request from the host system 200, an incoming facsimile through a public switched telephone network (PSTN), a data entry by an operator through an operation controller 26 and an operation panel 27, and so on. Upon detecting at least one of these events, the ESM controller 14 supplies the power to at least the unit which performs the operation required by the event.

Figure 4:
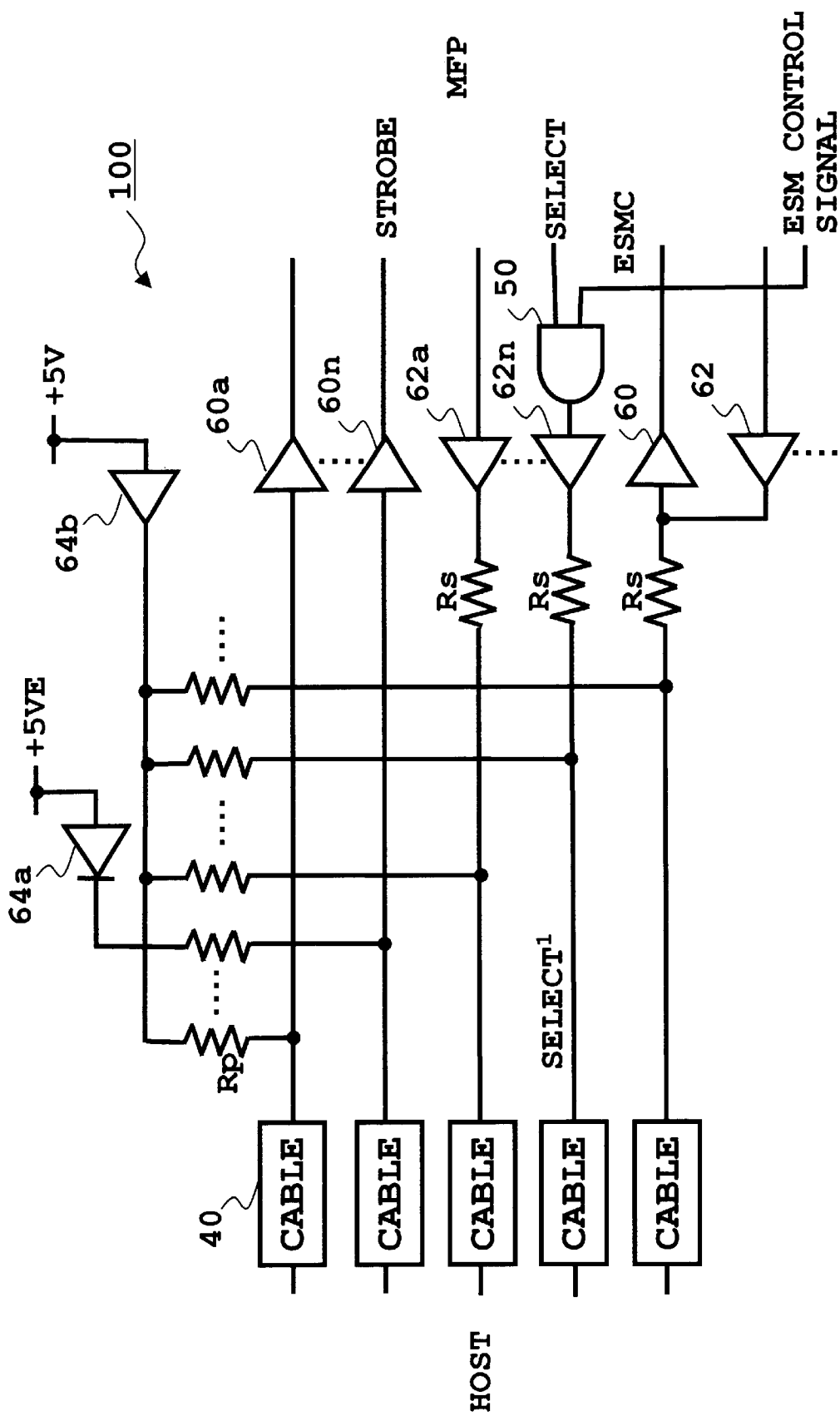
FIG. 4 is an exemplary interface circuit of a host interface included in the data processing apparatus of FIG. 1 according to an embodiment of the present invention.

The host interface 100 connects the MFP apparatus 10 to the host system 200 with a parallel interface connection in conformance with the IEEE (Institute of Electrical and Electronics Engineers) 1284 standard. The pin assignments of the host interface 100 according to the IEEE 1284 standard are shown in FIG. 2. Also, the signals from the host system 200 to the MFP apparatus 10 and from the MFP apparatus 10 to the host system 200 in a machine idling mode have the signal levels (high or low) as shown in FIG. 3. The machine idling mode refers to a mode in which a communications operation, which utilizes a control signal, such as a command signal or a status signal, or a data signal, is not being performed. In the MFP apparatus 10 according to an embodiment of the present invention, when an interface circuit controller portion 100a of the host interface 100 receives an output signal from the ESM controller 14 for requesting a mode shift into the energy saving mode (ESM), when the ESM controller 14 shifts the operation mode of the MFP apparatus 100 into the ESM, the interface circuit controller 100a cuts off power to portions of the host interface 100 having relatively high driving power requirements. Referring now to FIG. 4, the host interface 100 is also configured to send to the host system 200 an ESM (energy saving mode) indication signal. The ESM indication signal is a low level signal provided via one of the status signal lines. In this case, the status signal line SELECT' is used as the ESM indication signal. As shown in FIG. 3, select signal SELECT is a normally high level status signal in the machine idling mode. The ESM control signal ESMC, provided by controller 14 or interface controller 100a, is logically ANDed by AND gate 50 with the select signal SELECT and is sent to the host system 200. The ESM control signal is maintained as a high level signal in a normal mode so as to enable the select signal to normally be passed through AND gate 50. In the ESM mode, the ESM control signal ESMC is switched to a low level signal so as to force the select signal line SELECT' to a low level. Thereby, the host interface 100 can send a high level SELECT' signal in the normal mode and a low level SELECT' signal in the ESM MODE to the host system 200 to act as an ESM indication signal.

In the energy savings mode, power is supplied only to the circuitry portions of the host interface 100 necessary for receiving a strobe signal STROBE as a command signal line from the host system and the portions necessary for generating the select signal SELECT' as a status signal line. For example, in the energy savings mode, voltage +5VE is supplied to diode 64a which is connected to the input line for the STROBE signal via resistor Rp. Power is also supplied to receiver 60n as well as to driver 62n and AND gate 50. Voltage +5V is not supplied to diode 64b in the energy savings mode. This enables the MFP 10 to be able to detect an access from the host system 200 and to notify the host system 200 that the MFP apparatus 10 is not in a normal mode. Since the select signal SELECT' is a high level signal in a normal mode and indicates that the MFP apparatus 10 is in an on-line mode, reversing the select signal SELECT' to a low level signal and maintaining it in the low level when in the ESM MODE using the ESMC signal makes it possible for the host system 200 to judge whether the MFP apparatus 10 is in a normal machine idling mode or in the ESM mode without performing a sequential operation of sending a command and receiving a response.

In this way, the host system 200 can easily judge whether the MPP apparatus 10 is in the ESM MODE by reading the level of the select signal SELECT' sent from the host interface 100 of the MFP apparatus 10. Without such a configuration, the host system 200 may misjudge the status of the MFP apparatus 10 when the host system 200 detects an unstable status signal after the MFP apparatus 10 has entered the ESM MODE and the power to the host interface 100 has been cut off. The host system 200 may then send an inappropriate command to the MFP apparatus 10 for requesting a certain action which may cause the MFP apparatus 10 to perform an erroneous operation. However, with the above-described configuration, the host system 200 can avoid such an erroneous event. Also, with this configuration, the host system 200 can eliminate an operation required for sending a command to the MFP apparatus 10 and receiving a response therefrom so as to judge the status of the MFP apparatus 10.

In addition, the select signal SELECT' may not be the only signal used for judging whether the MFP apparatus 10 is in a normal machine idling mode. That is, a different signal or a combination of the select signal and other signals may allow the host system 200 to detect a mode shift to the ESM MODE.

Next, a host interface of the MFP apparatus according to another embodiment of the present invention is explained with reference to FIG. 5. A host interface according to this embodiment is referred to as a host interface 110. Since the MFP apparatus 10 shown in FIG. 1 and the MFP apparatus according to the present embodiment are otherwise the same, only the differences in the host interfaces will be described below, and details of the MFP apparatus will not be again described in detail.

Figure 5:
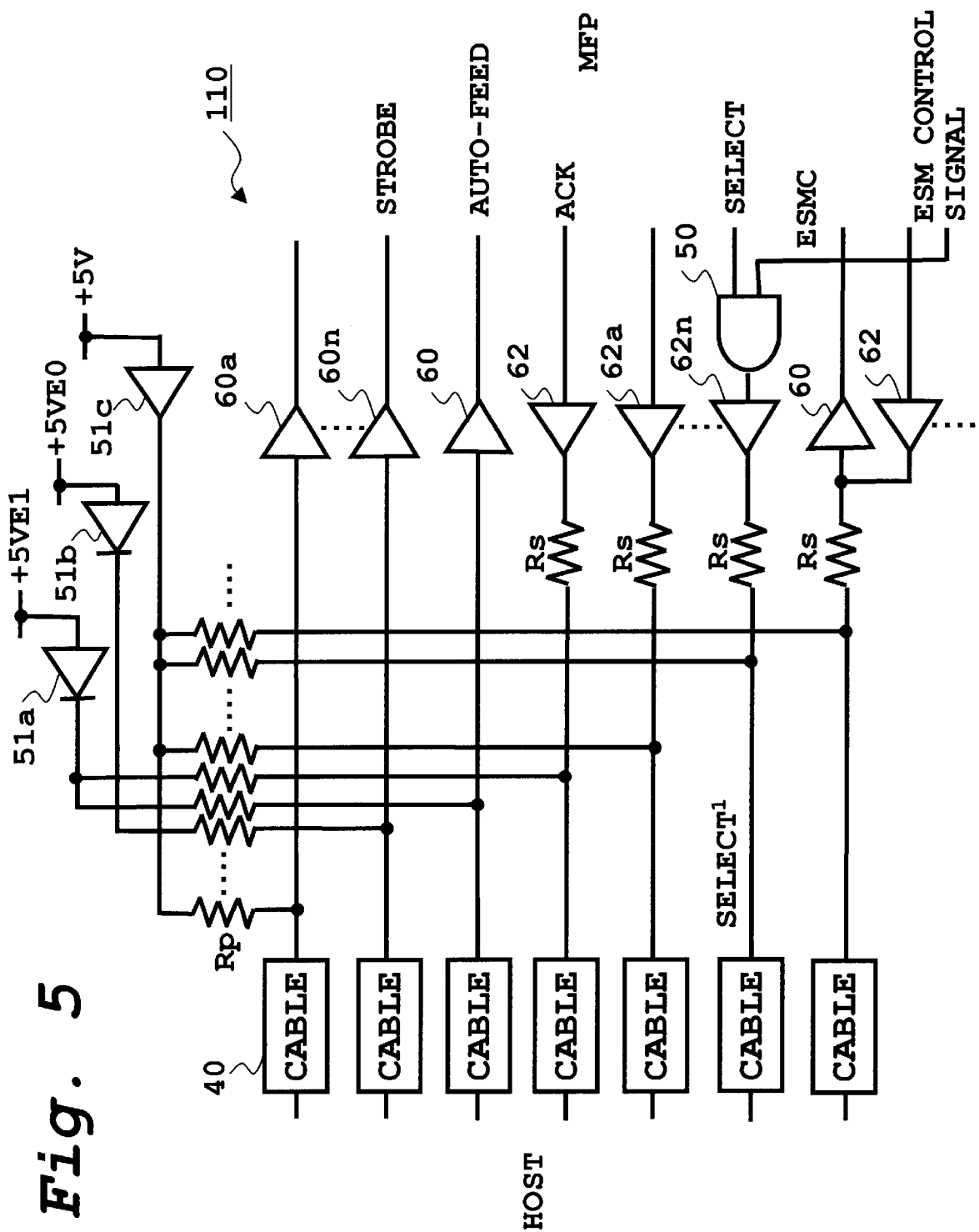
FIG. 5 is another exemplary interface circuit of a host interface included in the data processing apparatus of FIG. 1 according to another embodiment of the present invention.

The host interface 110 shown in FIG. 5 is configured to be able to control the signal level of a status signal line such as an ACK signal line, for example, which is expected to be changed to (or maintained as), a high level signal after the MFP enters the ESM mode from the machine idling mode. For this control, the host interface 110 uses the power of a command signal line such as an auto-feed signal AUTO-FEED sent from the host system 200 which is a high level signal when the host is in the machine idling mode. This is in addition to the operation for notifying the host system 200 that the MFP apparatus has entered the ESM mode from the normal machine idling mode by sending a status signal SELECT' made by ANDing the select signal and the ESM. control signal through the logical AND gate 50 as described above.

More specifically, in the host interface 110, an input line for the AUTO-FEED signal from among a plurality of command signals and an output line for the ACK signal from among a plurality of status signals are configured to exclusively share a protection diode 51. Accordingly, the ACK signal can be maintained as a high level signal using the bypass power of the AUTO-FEED signal and sent to the host system 200, provided that the host system 200 is in an operative condition and in the machine idling mode.

In this circuit of FIG. 5, protection resistors Rp are inserted between the command signal line of the AUTO-FEED signal and the protection diode 51 and between the status signal line of the ACK signal and the protection diode 51. The protection resistors Rp have a resistance of 1kilo-ohm or more which is in accordance with the recommendations of the IEEE 1284 standard, and have a relatively high resistance against input and output impedance (i.e., about 50 ohms). Thereby, the protection resistors Rp will not cause any problem to the operations performed by the MFP apparatus and the host system 200 even when they are operating in the normal operation modes. Voltages +5VE0 and +5VE1 are supplied to diodes 51b and 51a, respectively, in the energy savings mode. Power is also supplied to receiver 60n as well as to driver 62n and AND gate 50 in the energy savings mode. Voltage +5V is not supplied to diode 51c in the energy savings mode.

Generally, an amount of current consumption for a high level push/pull type output is determined by the impedance of a circuit to which the output current flows. According to this rule, a relatively large amount of current consumption may be required for maintaining the ACK signal as a high level signal in the host interface of the MFP apparatus having no protection measure and connected to a host system, when the MFP apparatus enters the energy saving mode at a time when the host system is turned off. However, in the present embodiment, the host interface 110 of the MFP apparatus can send to the host system 200 the ACK signal which is maintained as a high level signal using the high level AUTO-FEED signal through the command signal line. That is, the host interface 110 can maintain the ACK signal as a high level signal despite the fact that the MFP apparatus has entered the ESM mode, thereby avoiding the use of a relatively large amount of current consumption. In this case, if the host system 200 has been turned off, the host interface 110 cannot send the high level ACK signal to the host system. However, it will not cause any problem since the host system is in a power-off mode.

In addition, the host interface 110 of the MFP apparatus can increase an efficiency of performance in the energy saving mode. More specifically, a time period necessary for the host interface 110 to maintain and send a specific status signal at a high level to the host system 200 after entering the ESM is limited to a time period in which the host system 200 is in a machine idling mode and supplies the power to the host interface 110. Accordingly, the host interface 110 can hold the specific status signal at a high level using the power of the high level command signal sent from the host system 200. Also, when the host system 200 is in a power-off mode, it becomes unnecessary for the host interface 110 of the MFP apparatus to send the high level status signal to the host system 200. Furthermore, when the host system 200 is in a power-off mode, the host interface 110 can shut down its own power required for holding the status signal at a high level. In this way, the host interface 110 of the MFP apparatus according to this embodiment, can increase the efficiency of performance in the energy saving mode.

Alternatively, a status signal other than the ACK signal may be used for the same purpose in the ESM mode as described above. Also, any signal other than the status signals which are needed to be maintained at a high level in the ESM mode may be used. For example, a busy signal or a paper-end signal which are normally maintained as low level signals may be raised to a high level using the power of a command signal line from the host system 200. The thus raised high level signal may be used in place of the SELECT' signal made by ANDing the select signal SELECT and the ESM control signal ESMC for notifying the host system 200 that the MFP apparatus has entered the ESM mode.

Next, a host interface of the MFP apparatus according to another embodiment of the present invention is explained with reference to FIGS. 6 and 7. A host interface according to this embodiment is referred to as a host interface 120. Since the MFP apparatus 10 shown in FIG. 1 and the MFP apparatus according to the present embodiment are otherwise the same, only the differences in the host interfaces will be described.

Figure 6:
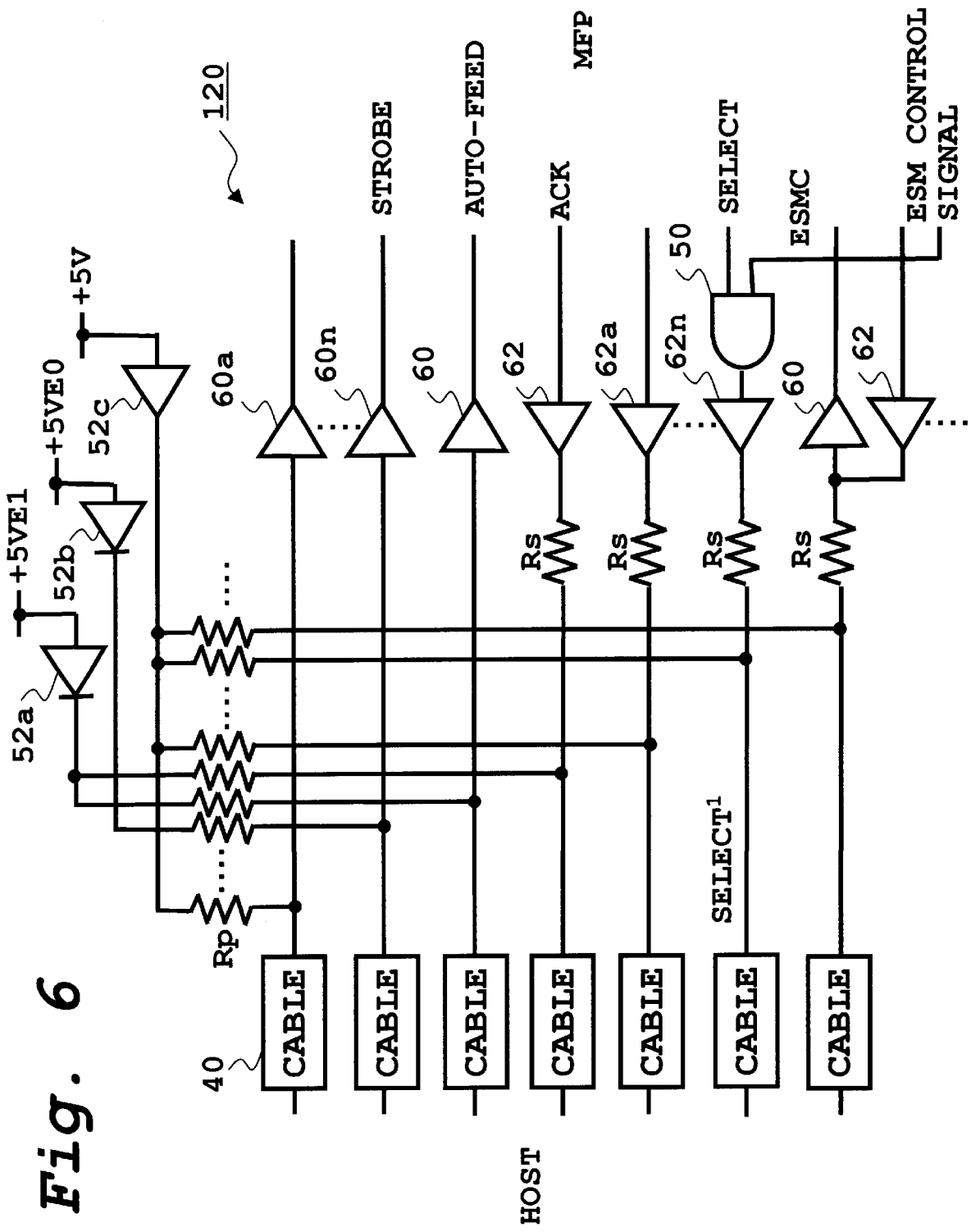
FIG. 6 is still another exemplary interface circuit of a host interface included in the data processing apparatus of FIG. 1 according to yet another embodiment of the present invention.
Figure 8A:
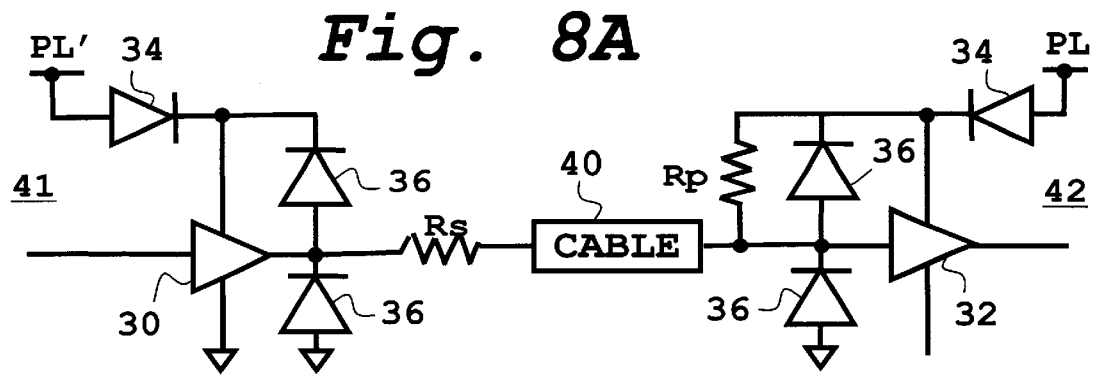
FIGS. 8A–8D are illustrations of circuits for explaining various driver and receiver arrangements.
Figure 8B:
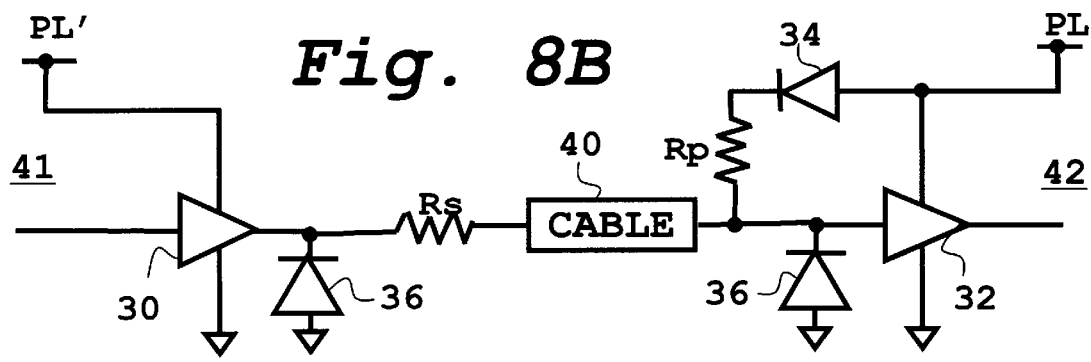
Figure 8C:
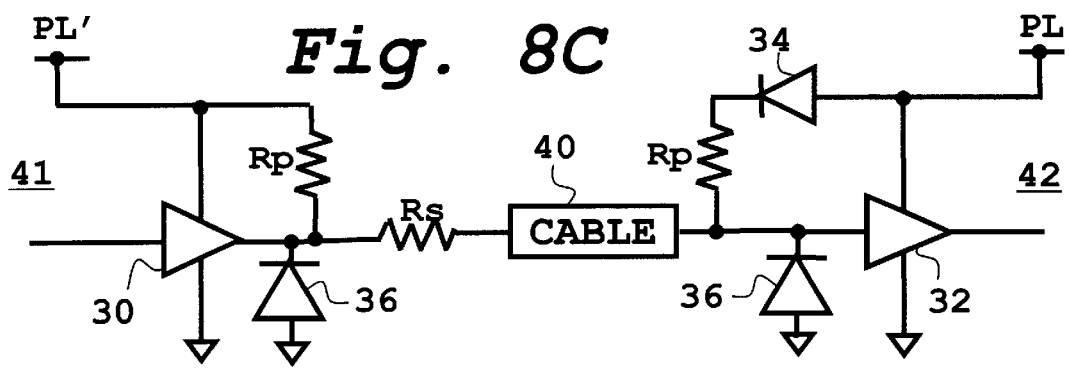
Figure 8D:
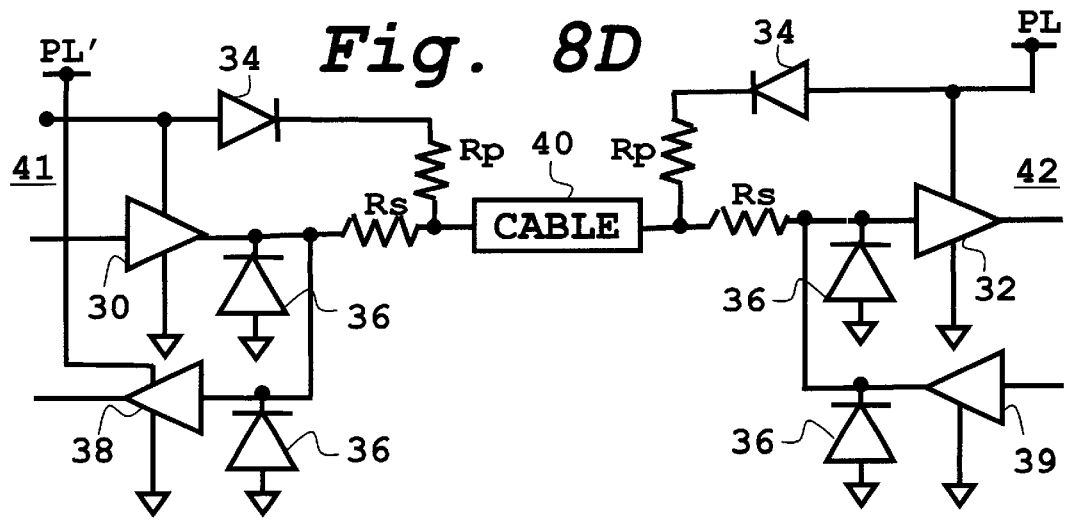
Figure 9:
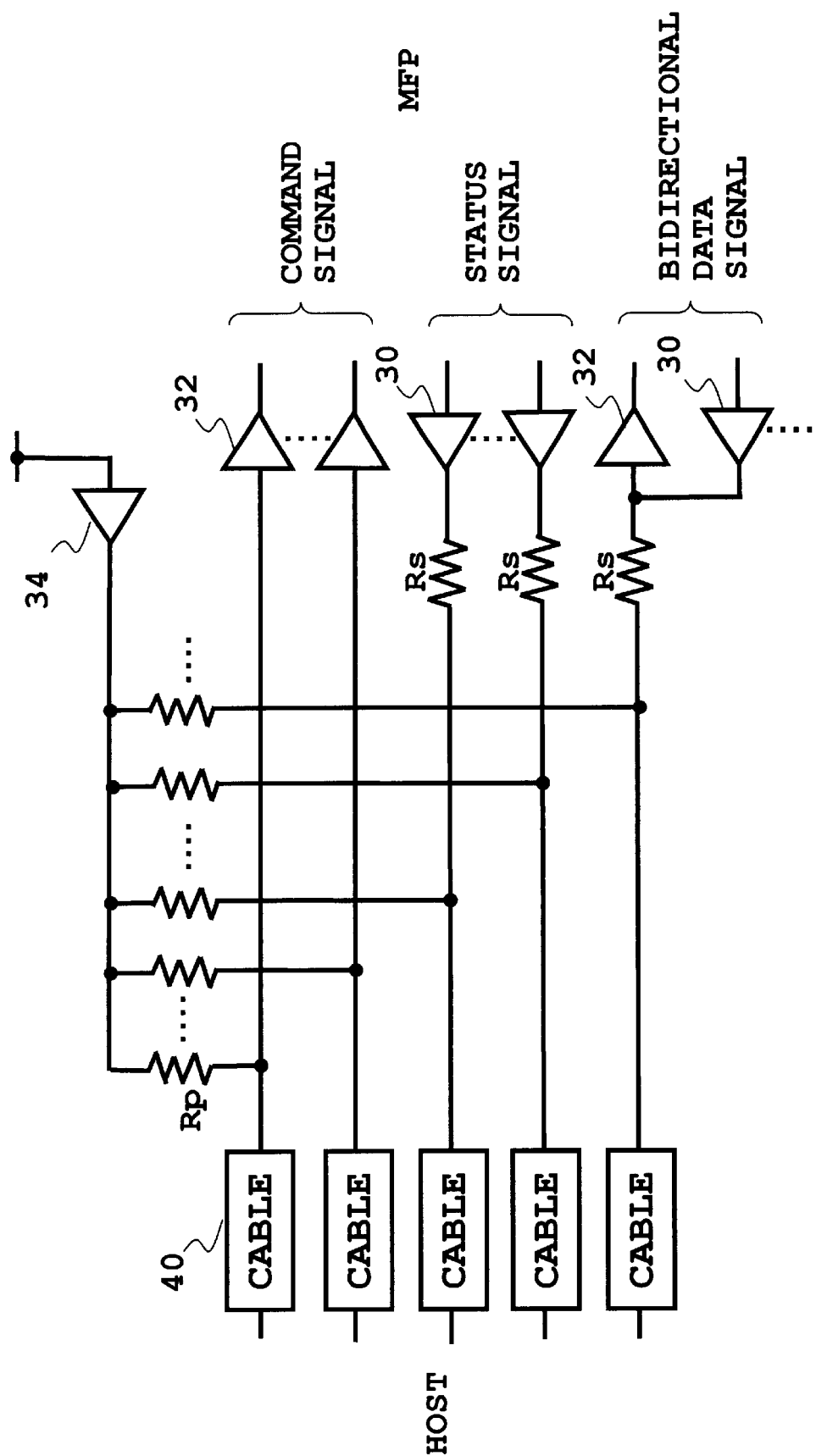
FIG. 9 is an illustration for explaining a cause of an unstable status signal.

The host interface 120 shown in FIG. 6 is configured to be able to apply the signal level of a command signal sent from the host system 200 to the status signal lines such as the ACK signal and the select signal lines when the power of the MFP apparatus is turned off. Thereby, the host system 200 can detect that the MFP apparatus is neither in a machine idling mode nor the energy saving mode but is in a power-off mode. The host interface 120 performs this operation in addition to the operations for notifying the host system 200 that the MFP apparatus has entered the ESM mode from the normal machine idling mode by ANDing the select signal SELECT and the ESM control signal ESMC as described above.

More specifically, in the host interface 120, an input line of the auto-feed signal AUTO-FEED from among a plurality of command signals and output lines of the ACK signal and the select signal SELECT' from among a plurality of status signals are configured to exclusively share a protection diode. When the host system 200 receives no low level select signal, meaning that the MFP apparatus is at least not in the ESM mode, nor any response to a command, the host system 200 may send a low level signal in place of the high level autofeed command signed AUTO-FEED through the command signal line for the auto-feed command signal. Then, the host system 200 can receive the low level ACK signal and the low level select signal which are different from those in the machine idling mode, using the bypass power of the low level signal sent from the host system 200. Thereby, the host system 200 can detect that the MFP apparatus is in a power off mode. In this embodiment, voltages +5VE0 and +5VE1 are supplied to diodes 52b and 52a, respectively, in the energy savings mode. Power is also supplied to receiver 60n as well as to driver 62n and AND gate 50 in the energy savings mode. Voltage +5V is not supplied to diode 52c in the energy savings mode.

That is, the host interface 120 can avoid the situation in which the host system 200 misjudges the status of the MFP apparatus because of unstable status signals. The host system 200 can confirm the status of the MFP apparatus by sending a low level signal in place of the normally high level AUTO-FEED signal to the MFP apparatus. Then, upon receiving a return low level signal through the status signal lines for the ACK signal and the select signal, the host system, 200 can determine that the MFP apparatus is in neither the normal machine idling mode nor the ESM mode but instead, is in the power-off mode. This confirmation is useful, in particular, when the host system 200 receives no status signal from the MFP apparatus, or is unable to check the status of the MFP apparatus because the host system 200 is in a power-off mode and the input and output buffers thereof have a high impedance.

In this embodiment, the host system 200 will receive from the MFP apparatus the status signals in various states, as shown in FIG. 7, in accordance with the statuses of the MFP apparatus.

In this way, the host system 200 can determine whether the MFP apparatus is in a power-off mode by simply sending to the MFP apparatus a low level signal in place of the high level AUTO-FEED signal and detecting the returned low level signal. In other words, the host interface 120 can avoid causing the host system 200 to perform unnecessary operations to judge the status of the MFP apparatus or incorrect operations due to the misjudgment of the status of the MFP apparatus.

In addition, with the above-described host interface 110 shown in FIG. 5, the MFP apparatus can notify the host system 200 that the MFP apparatus is in a power-off mode using the ACK signal in a similar manner to that performed by the MFP apparatus having the host interface 120 shown in FIG. 6. That is, the host interface 110 may arrange to change the level of the ACK signal to a level which is different from that in the machine idling mode and in the ESM mode so as to use it as an indication signal for the host system 200 to determine whether the MFP apparatus is in a power-off mode.

Numerous additional modifications and variations of the present invention are possible in light of the above teachings. It is therefore to be understood that within the scope of the appended claims, the present invention may be practiced otherwise than as specifically described herein.

This document is based on Japanese Patent application No. JPAP10-085476 filed in the Japanese Patent Office on Mar. 31, 1998, the entire contents of which are hereby incorporated by reference.

What we claim is:

1. An interface apparatus which connects between a host system and a data processing device and includes a parallel interface function for transmitting data, command, and status signals which are communicated therebetween, comprising:

an energy saving mode controller which selectively switches the apparatus to an energy saving mode from an idling mode in response to a predefined condition and, in said energy saving mode, cuts off power for driving an interface circuit, except for a minimal power required to be supplied to at least one predefined portion of the interface circuit; and an interface circuit controller which notifies said host system of a status of said interface apparatus using at least one of said status signals and, after having entered said energy saving mode, maintains said at least one status signal at a logic level which is reversed from a usual logic level thereof in said idling mode.

2. The interface apparatus as defined in claim 1, wherein said interface circuit controller notifies said host system of statuses of said interface apparatus using a second status signal, and maintains said second status signal at a high level after entering said energy saving mode, using power from a command signal from said host system which is raised to a high level in said idling mode, when said second status signal is required to be output as a high level signal after said interface apparatus has entered said energy saving mode.

3. An interface apparatus as recited in claim 2, wherein said command signal from said host system comprises an auto-feed signal Auto-Feed.

4. An interface apparatus as recited in claim 3, wherein said second status signal comprises an acknowledge signal Ack.

5. The interface apparatus as defined in claim 1, wherein said interface circuit controller receives a command signal from said host system, and notifies said host system of statuses of said interface apparatus using a second status signal by returning said command signal sent from said host system through said command signal line back to said host system as said second status signal having a different signal level from a signal level thereof in said idling mode or said energy saving mode when said interface apparatus is in a power-off mode.

6. An interface apparatus as recited in claim 5, wherein said command signal from said host system comprises an auto-feed signal Auto-Feed.

7. An interface apparatus as recited in claim 6, wherein said second status signal comprises an acknowledge signal Ack.

8. An interface apparatus as recited in claim 1, wherein the at least one status signal comprises a select signal.

9. An interface apparatus which connects between a host system and a data processing device and includes a parallel interface function for transmitting data, command, and status signals which are communicated therebetween, comprising:

energy saving mode control means for selectively switching the apparatus to an energy saving mode from an idling mode in response to a predefined event and, in said energy saving mode, cutting off power for driving an interface circuit, except for a minimal power required to be supplied to at least one predefined portion of the interface circuit; and interface circuit control means for notifying said host system of statuses of said interface apparatus using at least one of said status signals and, after having entered said energy saving mode, maintaining said at least one status signal at a logic level which is reversed from a usual logic level thereof in said idling mode.

10. The interface apparatus as defined in claim 9, wherein said interface circuit control means notifies said host system of statuses of said interface apparatus using a second status signal, and maintains said second status signal at a high level after entering said energy saving mode, using power from a command signal from said host system which is raised to a high level in said idling mode, when said second status signal is required to be output as a high level signal after said interface apparatus has entered said energy saving mode.

11. An interface apparatus as recited in claim 10, wherein said command signal from said host system comprises an auto-feed signal Auto-Feed.

12. An interface apparatus as recited in claim 11, wherein said second status signal comprises an acknowledge signal Ack.

13. The interface apparatus as defined in claim 9, wherein said interface circuit control means receives a command signal from said host system, and notifies said host system of statuses of said interface apparatus using a second status signal by returning said command signal sent from said host system through said command signal line back to said host system as said second status signal having a different signal level from a signal level thereof in said idling mode or said energy saving mode when said interface apparatus is in a power-off mode.

14. An interface apparatus as recited in claim 13, wherein said command signal line from said host system comprises an auto-feed signal Auto-Feed.

15. An interface apparatus as recited in claim 14, wherein said second status signal comprises an acknowledge signal Ack.

16. An interface apparatus as recited in claim 9, wherein the at least one status signal comprises a select signal.

17. An interfacing method of an interface apparatus which connects between a host system and a data processing device and includes a parallel interface function for transmitting data, command, and status signals which are communicated therebetween, comprising the steps of:

selectively switching the apparatus into an energy saving mode from an idling mode in response to a predefined event;

cutting off power for driving an interface circuit in said energy saving mode, except for a minimal power required to be supplied to at least one predefined portion of the interface circuit;

notifying said host system of statuses of said interface apparatus using at least one of said status signals; and maintaining the at least one status signal at a logic level which is reversed from a usual logic level thereof in said idling mode after having entered said energy saving mode.

18. The method as defined in claim 17, wherein said notifying step notifies said host system of statuses of said interface apparatus using a second status signal, and said maintaining step maintains said second status signal at a high level after entering said energy saving mode, using power from a command signal from said host system which is raised to a high level in said idling mode, when said second status signal is required to be output as a high level signal after said interface apparatus has entered said energy saving mode.

19. An interfacing method as recited in claim 18, wherein said command signal from said host system comprises an auto-feed signal Auto-Feed.

20. An interfacing method as recited in claim 19, wherein said second status signal comprises an acknowledge signal Ack.

21. The method as defined in claim 17, further comprising a receiving step for receiving a command signal from said host system, and wherein said notifying step notifies said host system of statuses of said interface apparatus using a second status signal by returning said command signal sent from said host system through said command signal line back to said host system as said second status signal having a different signal level from a signal level thereof in said idling mode or said energy saving mode when said interface apparatus is in a power-off mode.

22. An interfacing method as recited in claim 21, wherein said command signal from said host system comprises an auto-feed signal Auto-Feed.

23. An interfacing method as recited in claim 22, wherein said second status signal comprises an acknowledge signal Ack.

24. An interfacing method as recited in claim 17, wherein the at least one status signal comprises a select signal.

25. A data processing apparatus which connects to a host system and includes a parallel interface function for transmitting data, command, and status signals which are communicated with s aid host system, comprising:

an energy saving mode controller which selectively switches the apparatus to an energy saving mode from an idling mode in response to a predefined condition and, in said energy saving mode, cuts off power for driving an interface circuit, except for a minimal power required to be supplied to at least one predefined portion of the interface circuit; and an interface circuit controller which notifies said host system of statuses of said interface apparatus using at least one of said status signal and, after having entered said energy saving mode, and maintains said at least one status signal at a logic level which is reversed from a usual logic level thereof in said idling mode.

26. The data processing apparatus as defined in claim 25, wherein said interface circuit controller notifies said host system of statuses of said data processing apparatus using a second status signal, and maintains said second status signal at a high level after entering said energy saving mode, using power from a command signal from said host system which is raised to a high level in said idling mode, when said second status signal is required to be output as a high level signal after said data processing apparatus has entered energy saving mode.

27. A data processing apparatus as recited in claim 26, wherein said command signal from said host system comprises an auto-feed signal Auto-Feed.

28. A data processing apparatus as recited in claim 27, wherein said second status signal comprises an acknowledge signal Ack.

29. The data processing apparatus as defined in claim 25, wherein said interface circuit controller receives a command signal from said host system, and notifies said host system of statuses of said data processing apparatus using a second status signal by returning said command signal sent from said host system through said command signal line back to said host system as said second status signal having a different signal level from a signal level thereof in idling mode or said energy saving mode when said data processing apparatus is in a power-off mode.

30. A data processing apparatus as recited in claim 29, wherein said command signal from said host system comprises an auto-feed signal Auto-Feed.

31. A data processing apparatus as recited in claim 30, wherein said second status signal comprises an acknowledge signal Ack.

32. A data processing apparatus as recited in claim 25, wherein the at least one status signal comprises a select signal.

* * * * *